J. G. BALING.
NUT LOCK.
APPLICATION FILED SEPT. 8, 1911.
1,046,139.  Patented Dec. 3, 1912.
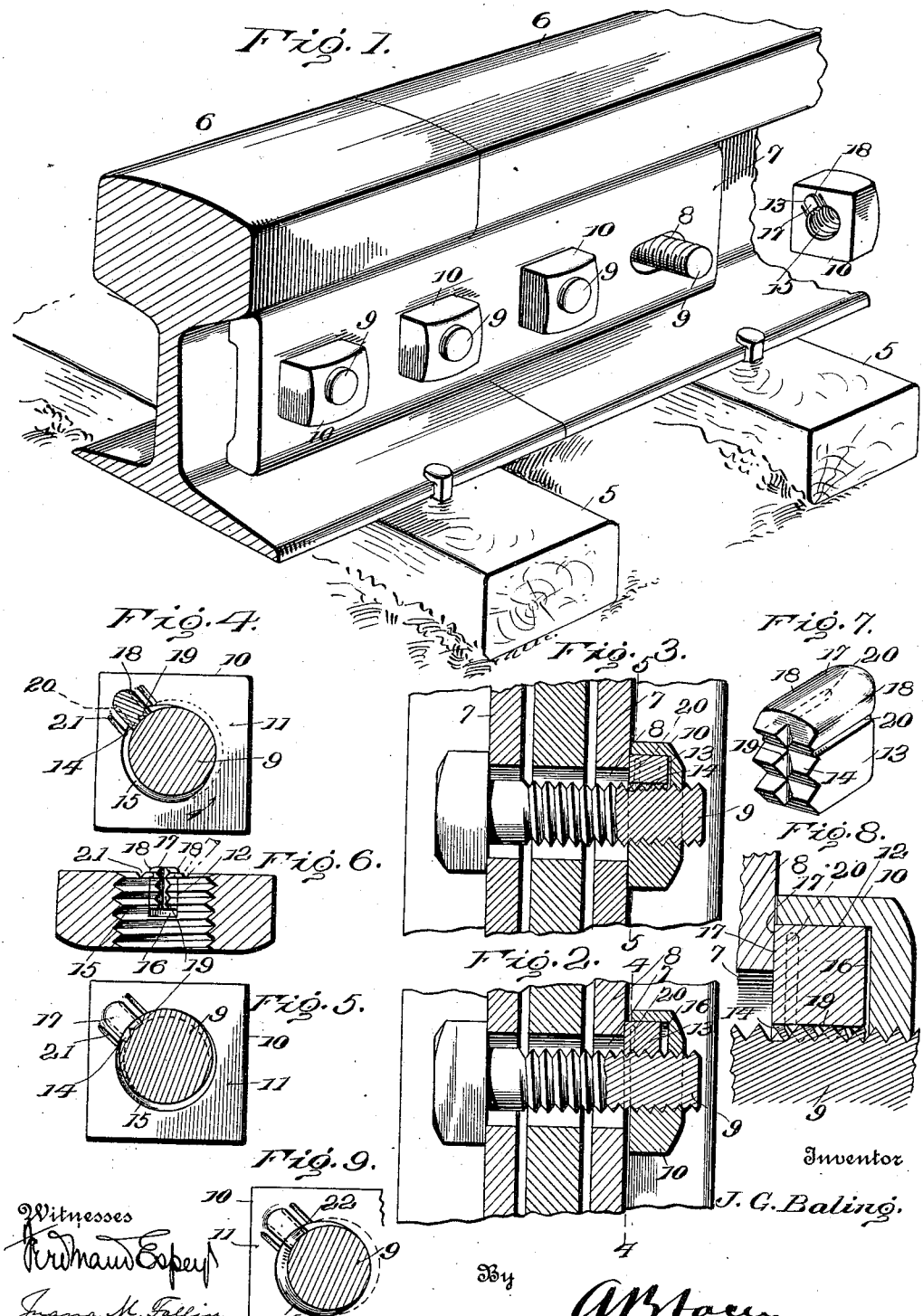
Witnesses
Inventor
J. G. Baling.
By
Attorney.

UNITED STATES PATENT OFFICE.

JOHN G. BALING, OF BALTIMORE, MARYLAND, ASSIGNOR OF ONE-TENTH TO HUGO STEINER, OF BALTIMORE, MARYLAND.

NUT-LOCK.

1,046,139.  Specification of Letters Patent.  Patented Dec. 3, 1912.

Application filed September 8, 1911. Serial No. 648,387.

*To all whom it may concern:*

Be it known that I, JOHN G. BALING, citizen of the United States, residing in the city of Baltimore and State of Maryland, have invented certain new and useful Improvements in Nut-Locks, of which the following is a specification.

This invention relates to nut locks and has for its primary object the provision of a comparatively simple and thoroughly efficient device of this character, by means of which a nut may be securely locked in adjusted position on the connecting bolt of a railway joint so as to prevent accidental rotation of the nut when subjected to jars and strains, incident to the passage of cars and other railway rolling stock.

A further object of the invention is to provide a nut having a seating recess formed in the inner face thereof and adapted to receive a locking key, the latter being provided with teeth adapted to automatically bite into the threads on a bolt when the nut is rotated in contact with a fish plate or other support.

A further object is to provide means for temporarily supporting the locking key in inoperative position with one end of said key spaced from the bottom of the seating recess and its other end projected beyond the inner face of the nut so that when the projected end of the key contacts with a fish plate or other support, the key will be moved longitudinally within the recess and transversely of the threads on the bolt.

A further object is to provide a nut lock, the construction of which is such that the locking key will effectually grip or bite into the threads on a bolt regardless of the size of the bolt receiving opening in the fish plate or other support through which the bolt passes.

A still further object of the invention is generally to improve this class of devices so as to increase their utility, durability and efficiency, as well as to reduce the cost of manufacture.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawing, in which:

Figure 1 is a perspective view of a section of railway track provided with a nut lock constructed in accordance with my invention; Fig. 2 is a longitudinal sectional view, showing the nut in adjusted position on a bolt and before the key has been actuated to grip the threads on the bolt; Fig. 3 is a similar view, showing the position of the locking key after the latter has been moved to operative position within the seating recess; Fig. 4 is a transverse sectional view taken on the line 4—4 of Fig. 2; Fig. 5 is a similar view taken on the line 5—5 of Fig. 3; Fig. 6 is a transverse sectional view of the nut, showing the position of the locking key before being moved to operative position; Fig. 7 is a perspective view of the locking key detached; Fig. 8 is an enlarged detail transverse sectional view showing the manner of clamping the metal between the teeth on the locking key when the latter is actuated to grip the threads on the bolt; Fig. 9 is a transverse sectional view illustrating a modified form of the invention.

Corresponding and like parts are referred to in the following description and indicated in all the views of the drawing by the same reference characters.

The improved nut lock forming the subject matter of the present invention is principally designed for preventing accidental rotation of the clamping nuts used on the connecting bolts of railway joints and the like, and by way of illustration is shown in connection with a section of track in which 5 designates the cross ties, 6 the rails and 7 the fish plates, the latter being provided with slots 8 to permit the passage of the securing bolts 9.

The nut 10 may be of any desired shape or configuration, but is preferably substantially rectangular in contour and provided on its inner face with a flat bearing surface 11 adapted to bear against the outer face of the adjacent fish plate 7. The nut 10 is provided with a seating recess 12 opening through the bearing surface 11 and communicating with the bolt receiving opening in the nut to permit the insertion of a locking key 13. The locking key 13 is slidably mounted within the seating recess 12, while the inner face thereof is provided with teeth 14, which form a continuation of the threads 15 of the bolt receiving opening in the nut so as to permit said nut to be adjusted longitudinally on the bolt 9 without interference. One end of the locking key 13 is normally spaced from the bottom wall 16 of the seating recess, while the other end thereof projects laterally beyond the bearing surface 11 to form a head 17, the opposite edges of which are preferably rounded or beveled at 18 so as to prevent the head from catching on any surface obstruction on the fish plate 7 when the nut is adjusted longitudinally of the securing bolt. By such a construction, when the nut 10 is adjusted on the bolt 9, the head 17 of the locking key will engage the fish plate 7 and thus be forced longitudinally within the seating recess 12, with the result that the teeth 14 of said locking key will bite into the threads on the bolt and thus effectually prevent accidental rotation of the nut. The teeth or threads 14 of the locking key are preferably notched or split at 19 so as to present a plurality of cutting or biting edges for engagement with the threads on the bolt.

As a means for holding the locking key 13 normally in inoperative position to permit adjustment of the nut on the bolt, the side walls of said key are provided with transverse grooves 20 adapted to receive a portion of the metal constituting the nut when the latter is struck with a chisel or other suitable tool, the kerf produced by the tool when the metal is forced within the grooves, being indicated at 21 in Fig. 6 of the drawing.

It will here be noted that the key 13 is normally supported within the seating recess 12 in such a manner that the threads or teeth 14 register with the threads or teeth 15 in the bolt receiving opening to permit adjustment of the nut without interference. When however, the locking key is forced longitudinally within the seating recess until the adjacent end of the locking key bears against the bottom 16 of the recess, the teeth 14 on said key will be moved out of alinement with the threads 15 on the nut and transversely of the threads on the bolt so as to cut or sever the threads on said bolt, as best indicated in Fig. 8 of the drawing. It will also be noted that the locking key 13 is disposed at one corner of the nut and at a point opposite the first thread on the nut.

In operation, the bolt 9 is extended through the fish plate and the nut 10 rotated thereon until the proper adjustment has been effected. As the inner face of the nut approaches the fish plate 7, the curved or rounded head 17 of the locking key will bear against the fish plate and thus be forced longitudinally within the seating recess, thereby causing the teeth 14 on the key to bite into or displace the threads on the bolt and effectually lock the nut against accidental rotation, as before stated. By having the locking key 13 disposed at one corner of the nut and provided with a relatively long head 17, said key will be actuated to automatically grip the threads on the bolt, regardless of the size of the bolt receiving opening in the fish plate or other support through which the bolt passes.

In Fig. 9 of the drawing, there is illustrated a modified form of the invention, in which the teeth on the locking key, instead of being split or notched, are continuous, as indicated at 22, the construction and operation of this form of nut lock being otherwise similar to that shown in Figs. 1 and 2 of the drawing.

While the nut lock is principally designed for preventing accidental rotation of the clamping nuts used on the securing bolts of railway rails, it will of course be understood that the device may be used with equally good results for preventing accidental rotation of bolts used in the construction of metal buildings, bridge work or wherever a device of this kind is found desirable or applicable.

Having thus described the invention, what is claimed as new is:

1. The combination with a bolt, of a nut having a seating recess formed in the inner face thereof, and a locking key slidably mounted in the recess and provided with a groove, the metal forming the nut being adapted to be pressed within the groove of the locking key for positively and temporarily supporting the locking key in spaced relation to the bottom of the seating recess, said key being movable automatically into engagement with the threads on the bolt when the nut is rotated in contact with a support.

2. The combination with a bolt, of a nut having a seating recess formed therein and communicating with the bolt receiving opening in the nut, and a locking key slidably mounted in said recess and provided with a head normally projecting beyond the inner face of the nut and having its side walls formed with grooves, the metal forming the nut being adapted to be pressed laterally within the grooves for positively supporting the locking key in inoperative position, said locking key being movable to operative position in engagement with the threads on the bolt when the nut is rotated in contact with a support.

3. The combination with a bolt, of a nut having its inner face provided with a flat bearing surface, there being a substantially rectangular seating recess formed in the nut and opening through the flat bearing surface and also communicating with the bolt receiving opening, and a correspondingly shaped locking key seated in the recess and having one end thereof normally spaced from the bottom of the recess and its other end projected beyond the flat bearing surface of the nut, said key being provided with a groove, and the metal at the bearing surface being pressed laterally within the groove for normally positively holding the locking key in inoperative position, said key being movable into engagement with the threads on the bolt when the nut is rotated in contact with a support.

4. The combination with a bolt, of a nut having a substantially rectangular seating recess formed therein and communicating with the bolt receiving opening in the nut, and a correspondingly shaped locking key seated within the recess and having one end thereof normally spaced from the bottom of the recess and its other end projected beyond the inner face of the nut, the inner face of said locking key being provided with teeth forming a continuation of the teeth of the bolt receiving opening, there being grooves formed in the opposite side faces of the key and adapted to receive a portion of the metal constituting the nut for normally and positively holding the teeth of the key in registration with the threads of the bolt receiving opening, the teeth on the locking key being movable into engagement with the threads on the bolt when the nut is rotated in contact with a support.

5. The combination with a bolt, of a nut having a substantially rectangular seating recess formed therein and communicating with the bolt receiving opening in the nut, and a correspondingly-shaped locking key seated in the recess and having one end thereof normally spaced from the bottom of the recess and its other end provided with a curved head projecting beyond the inner face of the nut, the inner face of the locking key being provided with transverse teeth adapted to normally register with the threads of the bolt receiving opening in the nut and the opposite sides thereof being formed with grooves, there being a substantially V-shaped notch formed in each tooth of the locking key, the metal forming the nut being adapted to be pressed inwardly within the grooves for normally and positively holding the locking key spaced from the bottom of the seating recess, the curved head of said key, by engagement with a fixed support, serving to force the teeth of the locking key into engagement with the threads of the bolt when the nut is rotated in contact with said support.

In testimony whereof I affix my signature in presence of two witnesses.

JOHN G. BALING. [L. S.]

Witnesses:
CARRIE M. GOHL,
HUGO STEINER.

---

Copies of this patent may be obtained for five cents each, by addressing the "Commissioner of Patents, Washington, D. C."